Figures 1, 2:
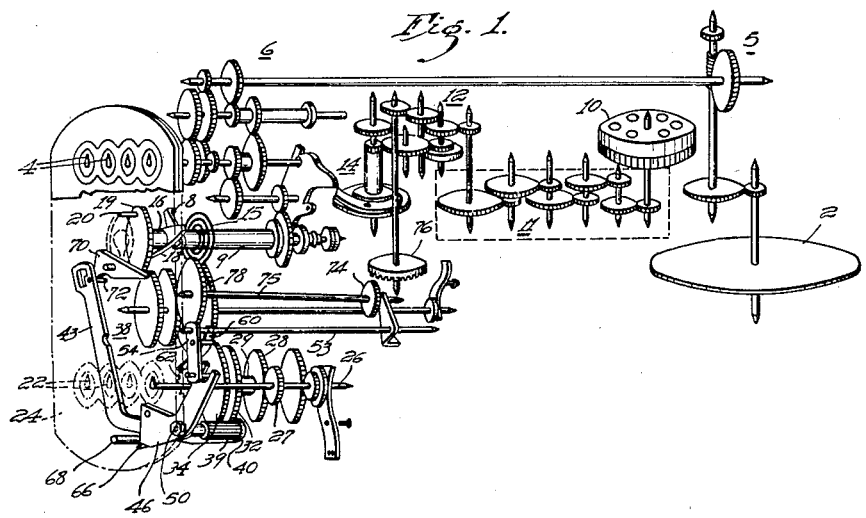

April 6, 1943.                R. H. LEWIS ET AL                  2,315,630
                BRAKING DEVICE FOR CUMULATIVE DEMAND REGISTERS
                              Filed May 7, 1941

WITNESSES:

INVENTORS
Robert H. Lewis and
Paul G. Adams.
BY
ATTORNEY

Patented Apr. 6, 1943

2,315,630

UNITED STATES PATENT OFFICE 2,315,630

BRAKING DEVICE FOR CUMULATIVE DEMAND REGISTERS

Robert H. Lewis, West Orange, and Paul G. Adams, Bloomfield, N. J., assignors to Westinghouse Electric & Manufacturing Company, East Pittsburgh, Pa., a corporation of Pennsylvania Application May 7, 1941, Serial No. 392,274

2 Claims. (Cl. 171—34)

The present invention relates to registers, and it has particular relation to a braking device for registers of the cumulative maximum demand type.

Registers of this type comprise, generally, a set of integrating dials for indicating the power consumption, a pointer for indicating the maximum demand over a billing period, and a set of cumulative dials arranged to have the maximum demand reading transferred thereto at the end of the billing period. The cumulative dials are ordinarily disconnected with the maximum demand indicator and it is intended that they remain stationary during the billing period. When the meter is read, these integrating dials are then connected directly to the demand pointer while it is being reset to zero position so that they are advanced in proportion to the maximum demand which occurred during that period. It has been found, however, that the jars and vibrations to which such a register is frequently subjected often cause accidental displacement of the cumulative dials when they should remain stationary and seriously affect the accuracy of the register.

According to the present invention, a brake member is provided for engaging a portion of the cumulative dials during the billing period to prevent such accidental movement. This braking device is preferably attached to the reset mechanism so as to be automatically released during the period in which the displacement of the maximum demand pointer is being transferred thereto. At the end of this resetting the brake device which is preferably of resilient construction is again brought into braking position.

It is, accordingly, an object of the invention to provide a brake arrangement for use with a cumulative type register.

Another object of the invention is to provide a brake for preventing accidental displacement of the cumulative dials of a cumulative demand type register.

A further object of the invention is to provide a brake which normally engages the cumulative dials of a cumulative demand type watthour meter register but is automatically released therefrom during the resetting operation of the maximum demand indicator so as to permit the cumulative dials to be driven thereby.

Other objects and advantages of the invention will appear from the following detailed description read in conjunction with the accompanying drawing, in which:

Figure 1 is an exploded perspective view of a register embodying the invention; and Figure 2 is a perspective view of a portion of the apparatus of Fig. 1 enlarged to more clearly show the present invention.

Referring to Fig. 1 of the drawing, there is shown a watt-hour meter register of the cumulative maximum demand type which is generally similar to that described in our United States Patent No. 2,259,314, issued October 14, 1941. Thus, a watthour meter disk 2 is connected to continuously drive indicating pointers 4 through a gear and pinion 5 and a gear assembly designated, generally, as 6. A pusher arm 8 is secured to a sleeve 9 which is periodically connected and disconnected with the gearing 6 to be driven from the watthour meter disk 2 for predetermined periods of time. In the apparatus shown, the connection of this arm 8 is controlled from a synchronism motor 10 which acts through reduction gearing 11 and 12 to operate a clutch designated, generally, as 14. This apparatus is such that the sleeve 9 is driven from the meter disk 2 for a selected demand period which may, for example, be 30 minutes. At the end of each such period, the clutch 14 operates to release the sleeve 9 from the driving mechanism and permits the pusher arm 8 to be returned to its zero position through the medium of a spiral spring 15. Another sleeve 16 is arranged concentrically on the same shaft as the sleeve 9 and has secured thereto an arm 18 and a gear 19, which latter member carries a maximum demand indicating pin 20. The arm 18 is thus driven by the arm 8 to assume a position corresponding to the maximum displacement of this latter arm during any demand period since the apparatus was last reset to zero. The arm 18 is arranged to retain this position until such resetting operation, and consequently, the pin 20 is moved in a clockwise direction a distance which indicates the value of this maximum demand.

A second set of integrating dials 22 which are likewise disposed to cooperate with scales on the register front 24 are provided for indicating the cumulative value of the maximum demands for all the billing periods. The first of these pointers is connected to a shaft 26 having thereon a gear 27 for engaging another gear 28 secured to a sleeve 29 disposed on a shaft 30. A gear 32 is also fixed to this sleeve while another sleeve carrying gears 34 and 35 is likewise mounted upon the shaft 30. The gear 34 is of the same size as the gear 32 and is disposed adjacent thereto while a gear train 38 is provided for interconnecting gear 34 with the gear 19 which carries the maximum demand indicating pin 20.

Referring also to Fig. 2, it will be seen that a long pinion member 39 is disposed immediately adjacent the gears 32 and 34 but normally out of engagement therewith. This pinion 39 is secured to a lever 40 which in turn is pivoted about a shaft 42, the front end of which fits within a bearing in the front plate 24 of the register. Another lever 43 is secured to the shaft 42 and has fixed thereto a pin 44 which resiliently engages the pinion 39. As described more fully in our aforementioned patent, this resilient effect is obtained by inserting the inner end of the pin 44 into a much larger axial opening in the pinion and resiliently biasing it against the lower surface of this opening by means of a crossed spring disposed about shaft 42 in Fig. 2.

A lever 46 having a slotted end 48 is pivotally secured to the end of the lever 43 by means of a nut 50, while a spring member 52 extends around this nut and has its ends in engagement with a pin 51 fixed to the register front 24 and to the inner end of the slotted lever 46.

A shaft 53 with its ends fixed to the register supporting structure has secured thereto an arm 54 through the other end of which extends a pin 56. This pin 56 engages the slot 48 while the arm is normally biased in a counterclockwise direction against a stop 58 by means of the spring 52.

A braking member 60 which is provided in accordance with the present invention is secured to this shaft 53 in any suitable manner and is arranged to engage the teeth of a gear 62 on the shaft 26. The member 60 is preferably of spring metal so that its engagement with the gear 62 is resilient and will not damage the structure. In addition, a pin 64 is preferably secured to the arm 54 to insure positive disengagement of this braking member, as will be more fully described hereinafter.

A relatively rigid spring member 66 is disposed around a member 67 engaging a stationary portion of the register, as described in the previously mentioned application, and has one end engaging the lower surface of the slotted lever 46, while its other end is fitted within an aperture in a resetting rod 68.

It will thus appear that during the normal operation of the register the pinion 39 is out of engagement with the gears 32 and 34, and that the dials 22 will be retained in their positions by means of the braking member 60 engaging the gear 62.

Upon resetting rod 68 being depressed the spring 66 will exert an upward force on the inner end of the lever 46, the slotted end of which engages in the stop member 58. The lever 46 thus moves in a clockwise direction to cause the lever 43 to rotate in a counterclockwise direction about the shaft 42. This counterclockwise movement of the lever 43 permits the edge of a latching lever 70 to drop between pins 72 thereon to secure the lever 43 in this new position. At the same time the movement of the lever 43 brings the elongated pinion 39 into resilient engagement with the gears 32 and 34 to mechanically connect the maximum demand indicating gear 19 to the integrating dials 22.

Upon the rod or plunger 68 returning to its outward position, the spring 52 acts to rotate the slotted lever 46 in a counterclockwise direction about the pin 50 to move the pin 56 inwardly away from the stop member 58. This movement of the lever 46 and arm 54 brings a gear 74 carried on a shaft 75 into engagement with a crown wheel 76 which is connected to be driven by the resetting motor 10. The shaft 75 also carries a gear 78 which continuously engages one of the gears in the gear train 38 so that the indicating gear 19 is driven towards its zero position in the manner described more fully in our copending application.

At the same time, this clockwise movement of the arm 54 causes a similar movement of the shaft 53 and, consequently, brings the resilient brake member 60 out of engagement with the gear 62 so that the dials 22 are free to move with the reseting motion of the maximum demand pointer. The pin 64 disposed on the arm 54 acts to insure that the spring 60 will move a sufficient distance to release the gear in this manner.

At the end of the resetting operation the pin 20 engages the end of a latching lever 70 to move it out of engagement with the pins 72 on the lever 43, and thus permits the entire resetting mechanism to return to its original position, as shown in Fig. 2. One of the results of this action is a counterclockwise movement of the arm 54 which thus brings the end of the brake member 60 into engagement with the gear 62. Since the member 60 is preferably of spring material, there is no possibility of any jarring resulting to damage the delicate register assembly.

From the above, it will appear that the present invention provides a novel automatic braking arrangement which will materially improve the operation and accuracy of cumulative registers of the maximum demand indicating type and will not interfere with its normal operation. The invention may readily be applied to devices of the manual reset type as well as to those employing a motor driven reset of the type described.

Since various modifications of the apparatus shown and described will appear to those skilled in the art, it is intended that the invention shall be limited only by the spirit and scope of the appended claims.

We claim as our invention:

1. In a register for an electric meter, a first indicator adapted to be displaced from a predetermined position in proportion to the maximum demand, a cumulative demand indicator normally unconnected with said first indicator and including a shaft having a gear secured thereon for movement therewith, means operable for interconnecting said indicators to permit motion to be transmitted therebetween, said interconnecting means including a member movable between a first normal position and a second position which it assumes when said means is in operative condition, a flexible brake member secured to said movable member to resiliently engage said gear while said interconnecting means is in inoperative condition and movable therewith to release said gear while said means is in operative condition, and means for resetting said first indicator to said predetermined position while connected with said cumulative indicator.

2. In a register for an electric meter, a first indicator adapted to be displaced from a predetermined position in proportion to the maximum demand, a cumulative demand indicator normally unconnected with said first indicator and including a shaft having a toothed gear secured thereon for movement therewith, means operable to interconnect said indicators for permitting movement to be transmitted therebetween, said interconnecting means including a pivotable shaft and a member pivotally movable therewith between a first normal position and a second position which it assumes when said means is in operative condition, a flexible braking strip secured to said shaft to resiliently engage said gear between adjacent teeth while said interconnecting means is in inoperative condition and movable therewith to release said gear while said means is in operative position, means on said movable member for engaging said braking strip at a point intermediate its ends to further exert a releasing pressure thereon upon movement of said movable member from said first to said second position, and means for resetting said first indicator to said predetermined position while connected with said cumulative indicator.

PAUL G. ADAMS.
ROBERT H. LEWIS.